United States Patent
Nakamura et al.

(10) Patent No.: US 9,200,111 B2
(45) Date of Patent: Dec. 1, 2015

(54) THERMOPLASTIC RESIN, RESIN COMPOSITION, AND MOLDING OF HIGH THERMAL CONDUCTIVITY

(75) Inventors: Mitsuru Nakamura, Settsu (JP); Shusuke Yoshihara, Settsu (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 13/983,825

(22) PCT Filed: Feb. 7, 2012

(86) PCT No.: PCT/JP2012/052700
§ 371 (c)(1),
(2), (4) Date: Aug. 6, 2013

(87) PCT Pub. No.: WO2012/108412
PCT Pub. Date: Aug. 16, 2012

(65) Prior Publication Data
US 2013/0313468 A1 Nov. 28, 2013

(30) Foreign Application Priority Data
Feb. 8, 2011 (JP) ................................ 2011-024739

(51) Int. Cl.
*C08G 63/193* (2006.01)
*C08L 67/02* (2006.01)
*C08G 69/44* (2006.01)
*C08L 77/12* (2006.01)
*C08G 63/685* (2006.01)

(52) U.S. Cl.
CPC .............. *C08G 63/193* (2013.01); *C08G 69/44* (2013.01); *C08L 67/02* (2013.01); *C08L 77/12* (2013.01); *C08G 63/6856* (2013.01)

(58) Field of Classification Search
CPC .............. C08G 63/185–63/189; C08G 63/193; C08G 63/6856; C08G 63/6886
See application file for complete search history.

(56) References Cited

U.S. PATENT DOCUMENTS

| | | | | |
|---|---|---|---|---|
| 5,138,022 | A | * 8/1992 | Mang et al. | .................... 528/272 |
| 5,526,150 | A | * 6/1996 | Mazaki et al. | ................. 349/117 |
| 2004/0147709 | A1 | 7/2004 | Akatsuka et al. | |
| 2006/0276568 | A1 | 12/2006 | Akatsuka et al. | |
| 2010/0016498 | A1 | 1/2010 | Kaji et al. | |
| 2011/0204282 | A1 | 8/2011 | Yoshihara et al. | |

FOREIGN PATENT DOCUMENTS

| | | | |
|---|---|---|---|
| EP | 378031 | A * | 7/1990 |
| JP | 3-17121 | A | 1/1991 |
| JP | 2003-266431 | A | 9/2003 |
| JP | 2007-224060 | A | 9/2007 |
| JP | 2010-195927 | A | 9/2010 |
| JP | 2011-231157 | A | 11/2011 |
| WO | 02/094905 | A1 | 11/2002 |
| WO | 2006/120993 | A1 | 11/2006 |
| WO | 2010/050202 | A1 | 5/2010 |

OTHER PUBLICATIONS

Hong (A Review on Thermal Conductivity of Polymer Composites Using Carbon-Based Fillers: Carbon Nanotubes and Carbon Fibers. Carbon Letters. 11(4). 2010. pp. 347-356).*
Antipov (First observation of a columnar mesophase in a carborane-containing main-chain semiflexible copolymer. Macromol. Rapid Commun. 1999, 20 , pp. 185-189).*
Astakhin (Structure of 1,7-diphenyl-m-carborane. pp. 327-328. Institute of Organometallic Compounds, Academy of Sciences of the USSR. Translated from Zhurnal Strukturnoi Khimii, 18(2), Mar.-Apr. 1977, pp. 406-408).*
English Translation of International Preliminary Report on Patentability mailed Aug. 22, 2013.
International Search Report for PCT/JP2012/052700 dated May 15, 2012.
Chinese Office Action dated May 6, 2014, issued in application No. 201280007795.8.

* cited by examiner

*Primary Examiner* — Brieann R Fink
(74) *Attorney, Agent, or Firm* — Sughrue Mion, PLLC

(57) ABSTRACT

The thermoplastic resin in accordance with the present invention includes a unit (A) by 25 mol % to 60 mol %, the unit (A) having a biphenyl group, a linear unit (e.g., a linear aliphatic hydrocarbon chain) (B) by 25 mol % to 60 mol %, and a unit (C) by 1 mol % to 25 mol %, the unit (C) having a substituent selected from the group consisting of non-fused aromatic groups, fused aromatic groups, heterocyclic groups, alicyclic groups, and alicyclic heterocyclic groups, each of which has an effect of folding a main chain.

13 Claims, No Drawings

THERMOPLASTIC RESIN, RESIN COMPOSITION, AND MOLDING OF HIGH THERMAL CONDUCTIVITY

CROSS REFERENCE TO RELATED APPLICATIONS

This application is a National Stage of International Application No. PCT/JP2012/052700, filed on Feb. 8, 20111, which claims priority from Japanese Patent Application No. 2011-024739, filed on Feb. 8, 2011, the contents of all of which are incorporated herein by reference in their entirety.

TECHNICAL FIELD

The present invention relates to (a) a thermoplastic resin and (b) a resin composition each of which (i) is a heat releasing material having an excellent thermal conductivity and (ii) can be injection molded and (c) a molded member (i.e., molding).

BACKGROUND ART

In a case where a thermoplastic resin composition is employed for various applications such as a housing of (i) a personal computer and (ii) a display, an electronic device material, and automotive exterior and interior, since plastic has a less thermal conductivity than an inorganic substance such as a metal material, there may be a problem that it is difficult to release generated heat. In order to solve such a problem, an attempt has been widely made to obtain a highly thermally conductive resin composition by blending a large amount of highly thermally conductive inorganic substance in a thermoplastic resin. As the highly thermally conductive inorganic compound, it is necessary to blend, in a resin, a highly thermally conductive inorganic substance such as graphite, carbon fiber, alumina, or boron nitride generally in an amount of not less than 30 vol % and further in an amount of as much as not less than 50 vol %. However, even in a case where a large amount of inorganic substance is blended in the resin, since the resin itself has a low thermal conductivity, there has been a limit to the thermal conductivity of the resin composition. For this reason, there is a demand for increasing the thermal conductivity of the resin itself.

For example, an epoxy resin described in Patent Literature 1 and a bismaleimide resin described in Patent Literature 2 are reported as a thermosetting resin in which a resin itself has an excellent thermal conductivity. These resins, which have a certain level of thermal conductivity, have a complex molecular structure, so as to be difficult to be produced. The epoxy resin described in Patent Literature 3 is relatively simple to be synthesized. However, the epoxy resin has an insufficient thermal conductivity.

Meanwhile, few research reports are provided on a thermoplastic resin in which a resin itself which is injection molded without a special molding process such as extension and magnetic field orientation has a high thermal conductivity. Patent Literature 4 is one of such few research reports. As to a thermoplastic resin described in Patent Literature 4, it is possible to obtain, by carrying out an injection molding, a molded member having a high thermal conductivity. However, a melt fluidity of the molded member is insufficient in a case where an inorganic filler is blended. For this reason, there is a demand for a higher melt fluidity in view of molding processability.

CITATION LIST

Patent Literatures

Patent Literature 1

International Publication No. 2002/094905, Brochure (Publication Date: Nov. 28, 2002)

Patent Literature 2

Japan Patent Application Publication, Tokukai, No. 2007-224060 A (Publication Date: Sep. 6, 2007)

Patent Literature 3

International Publication No. 2006/120993, Brochure (Publication Date: Nov. 16, 2006)

Patent Literature 4

International Publication No. 2010/050202, Brochure (Publication Date: May 6, 2010)

SUMMARY OF INVENTION

Technical Problem

As described above, the conventional thermoplastic resin has various problems. In particular, a thermoplastic resin tends to be fragile, so that a thermoplastic resin composition containing the thermoplastic resin and an inorganic filler has a low mechanical strength such as a flexural strength. For this reason, there is a demand for increasing the mechanical strength of the thermoplastic resin composition. However, in a case where polymerization is carried out by adding another polymer component to the thermoplastic resin in order to increase the mechanical strength, a thermal conductivity of the thermoplastic resin thus obtained decreases, so that a thermal conductivity of the thermoplastic resin composition decreases. For this reason, it has been technically difficult to increase the mechanical strength such as the flexural strength and to maintain the thermal conductivity.

The present invention is accomplished in view of the above-mentioned problem. An object of the present invention is to provide, by polymerizing another polymer component to a thermal conductive polymer component, a thermoplastic resin which (i) has an excellent thermal conductivity by itself and (ii) serves as a material of a thermoplastic resin composition having an increased flexural strength. Moreover, in addition to the object described above, it is another object to provide a thermoplastic resin and a thermoplastic resin composition having a high melt fluidity.

Solution to Problem

As a result of diligent study, the inventors found that in a case where a third component which has a folding effect of a main chain is copolymerized to a polycondensate which has a given molecular structure having a high thermal conductivity, a thermoplastic resin which (i) maintains a high thermal conductivity by itself and (ii) serves as a raw material of a thermoplastic resin composition having an increased flexural strength can be attained even though the third component is contained therein.

Moreover, the inventors found that the thermoplastic resin in accordance with the present invention has a higher melt fluidity than a thermoplastic resin in which no third component is copolymerized, so as to accomplish the present invention based on the finding. The present invention can be described as 1) below.

1)
A thermoplastic resin, including a unit (A) by 25 mol % to 60 mol %, the unit (A) has a biphenyl group and is represented by general formula (1):

[Chem. 1]

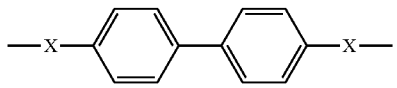

(1)

wherein X represents a bivalent substituent selected from the group consisting of O and CO;
a unit (B) by 25 mol % to 60 mol %, the unit (B) being represented by general formula (2):

—Y—R—Y- (2)

wherein R represents a bivalent linear substituent (a) whose number of atoms in its main chain length is 2 to 20 and (b) which is branched or not branched, and Y represents a bivalent substituent selected from the group consisting of O and CO; and
a unit (C) by 1 mol % to 25 mol %, the unit (C) being represented by general formula (3):

—$Z^1$-A-$Z^2$- (3)

wherein $Z^1$ and $Z^2$ represent a bivalent substituent(s) selected from the group consisting of 0, NH, CO, S, and NHCO, and A represents a substituent selected from the group consisting of non-fused aromatic groups, fused aromatic groups, heterocyclic groups, alicyclic groups, and alicyclic heterocyclic groups, each of which has an effect of folding a main chain, where a total amount of the units (A), (B), and (C) is 100 mol %.

Advantageous Effects of Invention

A thermoplastic resin in accordance with the present invention, even though it contains a third component, has such an advantage that the thermoplastic resin maintains a high thermal conductivity by itself and serves as a raw material of a thermoplastic resin composition having an increased flexural strength. Additionally, the resin shows an excellent melt fluidity both in case where the resin is solely injection-molded and in case where the resin with an inorganic filler blended therein is injection-molded.

DESCRIPTION OF EMBODIMENTS

The thermoplastic resin in accordance with the present invention is liquid crystalline and has a liquid crystalline phase transition temperature and an isotropic phase transition temperature. The thermoplastic resin in accordance with the present invention shows a high thermal conductivity when injection-molded in such a manner that the resin heated at a temperature between the liquid crystalline phase transition temperature and the isotropic phase transition temperature thereby being in a liquid crystalline state is injected. The thermoplastic resin in accordance with the present invention has an excellent melt fluidity in the injection molding. The melt fluidity referred to in the present invention is fluidity in the liquid crystalline state.

The thermoplastic resin in accordance with the present invention, has a main chain structure including a unit (A) by 25 mol % to 60 mol %, the unit (A) having a biphenyl group and being represented by general formula (1):

[Chem. 2]

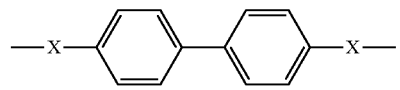

(1)

wherein X represents a bivalent substituent selected from the group consisting of O and CO;
a unit (B) by 25 mol % to 60 mol %, the unit (B) being represented by general formula (2):

—Y—R—Y- (2)

wherein R represents a bivalent linear substituent (a) whose number of atoms in its main chain length is 2 to 20 and (b) which is branched or not branched, and Y represents a bivalent substituent selected from the group consisting of O and CO; and
a unit (C) by 1 mol % to 25 mol %, the unit (C) being represented by general formula (3):

—$Z^1$-A-$Z^2$- (3)

wherein $Z^1$ and $Z^2$ represent a bivalent substituent(s) selected from the group consisting of 0, NH, CO, S, and NHCO, and A represents a substituent selected from the group consisting of non-fused aromatic groups, fused aromatic groups, heterocyclic groups, alicyclic groups, and alicyclic heterocyclic groups, each of which has an effect of folding a main chain, where a total amount of the units (A), (B), and (C) is 100 mol %.

The thermoplastic referred to in the present invention indicates a property of being plasticiable by heat. The thermoplastic resin in accordance with the present invention is preferably a thermoplastic resin having a unit (A) of 30 mol % to 55 mol %, a unit (B) of 30 mol % to 55 mol %, and a unit (C) of 1 mol % to 20 mol %. It is more preferable that the thermoplastic resin in accordance with the present invention is a thermoplastic resin having a unit (A) of 30 to 46 mol %, and a unit (B) of 45 mol % to 55 mol %, and a unit (C) of 2 mol % to 15 mol %. In a case where the unit (C) is less than 1 mol %, adding the third component becomes meaningless and the melt fluidity shows no significant increase. In a case where the unit (C) is not less than 26 mol %, the thermal conductivity would possibly decrease.

The thermal conductivity of the thermoplastic resin in accordance with the present invention is preferably not less than 0.5 W/(m·K), more preferably not less than 0.6 W/(m·K), further preferably not less than 0.8 W/(m·K), and particularly preferably not less than 1.0 W/(m·K). An upper limit of the thermal conductivity is not particularly limited, and it is preferable that the thermoplastic resin has a higher thermal conductivity. In a case where no physical treatment such as a magnetic field, voltage impression, rubbing, or extension is carried out in the injection molding, the thermal conductivity of the thermoplastic resin is generally not less than 30 W/(m·K), and further not less than 10 W/(m·K).

It is preferable that a melt flow rate, which indicates the melt fluidity of the thermoplastic resin ((unit (A):unit (B):unit (C)=$X_A$:$X_B$:$X_C$)) in accordance with the present invention, is higher. In the thermoplastic resin of the present invention, the melt flow rate is only required to be higher than that of a thermoplastic resin (unit (A):unit (B):unit (C)=$X_A$:$X_B$:0) to which no unit (C) is added. Specifically, the melt flow rate of the thermoplastic resin preferably by not less than 1.1 times, more preferably by not less than 1.5 times, and particularly preferably by not less than 2 times.

General formula (1)

[Chem. 3]

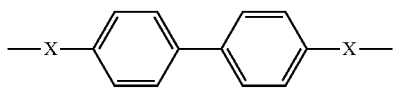

(1)

wherein X represents a bivalent substituent selected from the group consisting of O and CO. For the sake of obtaining a resin having an excellent thermal conductivity, X is preferably O.

General formula (2):

—Y—R—Y- (2)

wherein R represents a bivalent linear substituent (a) whose number of atoms in its main chain length is 2 to 20 and (b) which is branched or not branched, and Y represents a bivalent substituent selected from the group consisting of O and CO. For the sake of obtaining a resin having an excellent thermal conductivity, Y is preferably CO.

R in the general formula (2) represents a bivalent linear substituent (a) whose number of atoms in its main chain length is 2 to 20 and (b) which is branched or not branched. It is preferable that R is the linear aliphatic hydrocarbon chain which is not branched. In a case where R is branched, crystallinity would decrease, so that the thermal conductivity decreases. R can be either saturated or unsaturated, but is preferably a saturated aliphatic hydrocarbon chain. In a case where R contains an unsaturated bond, sufficient flexibility would not be obtained, so that the thermal conductivity decreases. R is preferably a linear saturated C2-C20 aliphatic hydrocarbon chain, more preferably a linear saturated C4-C18 aliphatic hydrocarbon chain, and particularly preferably a linear saturated C8-C14 aliphatic hydrocarbon chain. The number of atoms in the main chain length of R is preferably an even number. In a case where the number of atoms in the main chain length of R is an odd number, the crystallinity would decrease, so that the thermal conductivity decreases. In particular, for the sake of obtaining a resin having an excellent thermal conductivity, R is preferably at least one selected from the group consisting of —$(CH_2)_8$—, —$(CH_2)_{10}$—, and —$(CH_2)_{12}$—.

In a case where R is —$(CH_2)_8$—, a plant-based compound such as sebacic acid can be used as a raw material of the unit (B) represented by the general formula (2), so that the thermoplastic resin can be produced at a low environmental load.

The thermoplastic resin wherein R is —$(CH_2)_8$— is cost advantageous as compared with the thermoplastic resin wherein R is —$(CH_2)_{10}$—. The thermoplastic resin wherein R is —$(CH_2)_8$— would advantageously have a higher thermal conductivity than the thermoplastic resin containing no unit (C), even though it depends on a molecular weight and a molar ratio of each unit whether such an increase in the thermal conductivity would occur. Therefore, it can be said that the thermoplastic resin wherein R is —$(CH_2)_8$— is advantageous in this regard as well.

General formula (3)

—$Z^1$-A-$Z^2$- (3)

wherein $Z^1$ and $Z^2$ represent a bivalent substituent(s) selected from the group consisting of O, NH, CO, S, and NHCO, and A represents a substituent selected from the group consisting of non-fused aromatic groups, fused aromatic groups, heterocyclic groups, alicyclic groups, and alicyclic heterocyclic groups, each of which has an effect of folding a main chain. Here the effect of folding a main chain indicates an effect of bending a high molecular main chain as if it is folded, and an angle between bonds constituting the main chain is not more than 150°, preferably not more than 120°, and more preferably not more than 60°. Specific examples of A in the formula encompass groups shown below.

[Chem. 4]

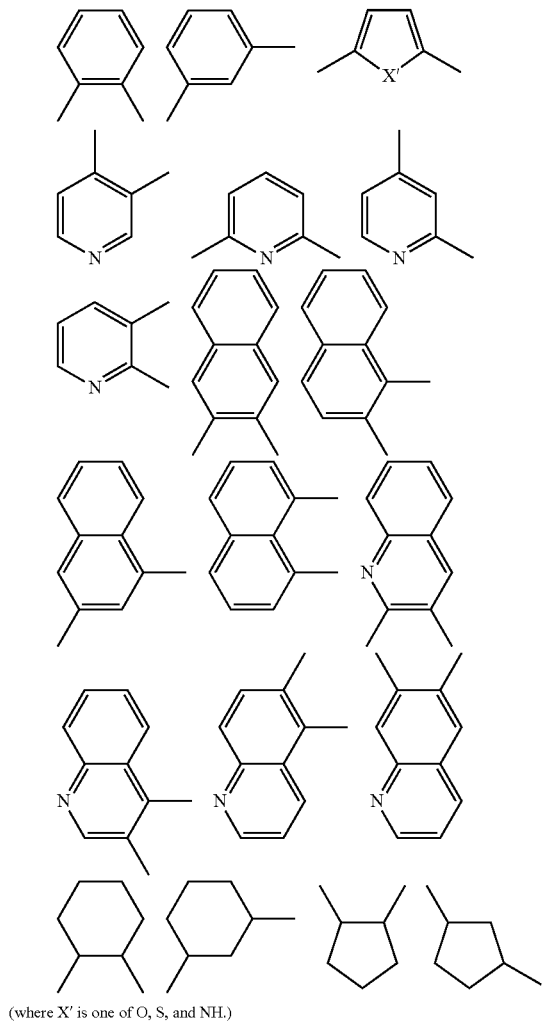

(where X' is one of O, S, and NH.)

For the sake of obtaining a resin having an excellent thermal conductivity, preferable examples of A in the formula encompass groups shown below.

[Chem. 5]

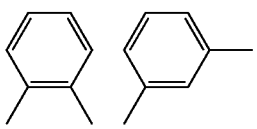

Moreover, for the sake of obtaining a resin having an excellent thermal conductivity, A in the formula is more preferably a group shown below.

[Chem. 6]

Since the high molecular main chain is bent by A, there is an advantage that the mechanical strength such as the flexural strength of the thermoplastic resin increases as compared with a structure containing no unit (C). In other words, the thermoplastic resin in accordance with the present invention is improved to be less fragile by containing the unit (C) as a polymer component.

Note that, A of the formula (3) does not contain a group in a para-shape in which an angle between bonds constituting the main chain is 180°. Such a group does not have a folding effect, so that a thermoplastic resin in which such a group is polymerized as a unit has a low thermal conductivity.

$Z^1$ and $Z^2$ in the general formula (3) represent a bivalent substituent selected from the group consisting of O, NH, CO, S, and NHCO. For the sake of obtaining a resin having an excellent thermal conductivity, it is preferable that $Z^1$ and $Z^2$ are one of O, NH, and CO, and it is more preferable that both $Z^1$ and $Z^2$ are O.

A number average molecular weight of the thermoplastic resin in accordance with the present invention is measured by GPC in which polystyrene is used as a standard, and a solution in which the thermoplastic resin of the present invention is dissolved in a solvent in which p-chlorophenol and toluene are mixed in a volume ratio of 3:8 so as to be a 2.5% by weight solution is measured at 80° C. The thermoplastic resin in accordance with the present invention has a number average molecular weight of 3000 to 40000, preferably of 5000 to 30000, and more preferably of 7000 to 20000. In a case where the number average molecular weight is less than 3000 or more than 40000, a resin having an identical primary structure may have a thermal conductivity of less than 0.6 W/(m·K). The thermoplastic resin in accordance with the present invention can be produced by any well-known method. For the sake of simply controlling a structure, the thermoplastic resin in accordance with the present invention is preferably produced by reacting (i) a compound having a reactive functional group at both polymer chain ends of the biphenyl group, (ii) a compound having a reactive functional group at both polymer chain ends of the linear substituent R, and (iii) a compound having two reactive functional groups in a substituent A having an effect of folding a main chain. Examples of such a reactive functional group encompass a well-known group such as a hydroxyl group, a carboxyl group, an ester group, an amino group, a thiol group, and an isocyanate group. A condition under which such groups are caused to react with each other is not particularly limited.

For the sake of simply carrying out synthesis, a combination of the compound having a reactive functional group at both polymer chain ends of the biphenyl group and the compound having a reactive functional group at both polymer chain ends of the linear substituent R is preferably (i) a combination of a compound having a hydroxyl group at both polymer chain ends of the biphenyl group and a compound having a carboxyl group at both polymer chain ends of the linear substituent R or (ii) a combination of a compound having a carboxyl group or an ester group at both polymer chain ends of the biphenyl group and a compound having a hydroxyl group at both polymer chain ends of the linear substituent R. Further, it is preferable that the compound having two reactive functional groups in a substituent A having an effect of folding a main chain has, in the substituent A having an effect of folding a main chain, at least one of the hydroxyl group, the carboxyl group, the ester group, and the amino group.

One example of a method for producing a thermoplastic resin which is constituted by (i) the compound having a hydroxyl group at both polymer chain ends of the biphenyl group, (ii) the compound having a carboxyl group at both polymer chain ends of the linear substituent R, and (iii) a compound having a hydroxyl group in a substituent A having an effect of folding a main chain is as follows: the hydroxyl groups of the compounds are individually or collectively converted to a lower fatty acid ester(s) with a lower fatty acid(s) such as acetic anhydride and then lower fatty acid-eliminating polycondensation reactions of the compounds and the compound having a carboxyl group at both polymer chain ends of the linear substituent R are carried out in a reaction vessel or in separate reaction vessels. The polycondensation reaction is carried out in a state in which (i) substantially no solvent and (ii) an inert gas such as nitrogen are contained, at a temperature of generally in a range of 220° C. to 330° C. and preferably in a range of 240° C. to 310° C., under an ordinary pressure or under a reduced pressure for 0.5 hour to 5 hours. The polycondensation reaction progresses slowly at a reaction temperature less than 220° C. On the other hand, a side reaction such as decomposition is likely to occur at a reaction temperature higher than 330° C. In a case where the polycondensation reaction is carried out under the reduced pressure, it is preferable to gradually reduce the pressure. In a case where the pressure is suddenly reduced to a high degree of vacuum, a monomer having the linear substituent R and a monomer having the effect of folding a main chain would be volatilized, so that a resin having a desired composition or a resin having a desired molecular weight may not be obtained. An ultimate degree of vacuum is preferably not more than 40 torr, more preferably not more than 30 torr, further preferably not more than 20 torr, and particularly preferably not more than 10 torr. In a case where the degree of vacuum is more than 40 torr, it may be possible that the acid elimination is insufficient, so that a resin having a low molecular weight is obtained. It is possible (i) to perform the polydecomposition with multi-stages reaction temperatures or (ii) to perform the polydecomposition in such a manner that a reaction product in a melted state is collected, as needed, while the reaction temperature is increasing or immediately after the reaction temperature reaches the maximum temperature. The thermoplastic resin thus obtained can be used as it is, or can be used after an unreacted raw material is removed therefrom or after being subjected to solid phase polymerization in order to improve a physical property of the thermoplastic resin. In a case where the solid phase polymerization is carried out, it is preferable that (i) the thermoplastic resin thus obtained is mechanically crushed into particles whose size is not more than 3 mm, preferably not more than 1 mm, and then (ii) the particles in a solid-phase state are processed, for 1 hour to 30 hours, at a temperature in a range of 100° C. to 350° C. (a) in an atmosphere of an inert gas such as nitrogen or (b) under a reduced pressure. A particle size of more than 3 mm is not preferable because the particles with such a particle size cannot be processed sufficiently, thereby resulting in a physical property problem. It is preferable to select such a processing temperature and a heating rate for the solid phase polymerization that avoid fusion of the particles of the thermoplastic resin.

Examples of an acid anhydride of lower fatty acid which acid anhydride is used to produce the thermoplastic resin in accordance with the present invention encompass an acid anhydride of a C2-C5 lower fatty acid such as acetic anhydride, propionic acid anhydride, monochloroacetic acid anhydride, dichloroacetic acid anhydride, trichloroacetic acid anhydride, monobromoacetic acid anhydride, dibromoacetic acid anhydride, tribromoacetic acid anhydride, monofluoroacetic acid anhydride, difluoroacetic acid anhydride, trifluoroacetic acid anhydride, butyric anhydride, isobutyric acid anhydride, valeric acid anhydride, and pivalic acid anhydride. In particular, acetic anhydride, propionic acid anhydride, and trichloroacetic acid anhydride are preferably used. The acid anhydride of lower fatty acid is used in an equivalent weight of 1.01 to 1.5, and preferably of 1.02 to 1.2 with respect to a total amount of the hydroxyl groups and the amino groups contained in the monomer to be used. In a case where the acid anhydride of lower fatty acid is used in an equivalent weight of less than 1.01, it may be possible that since the acid anhydride of lower fatty acid is volatilized, the hydroxyl group and the amino group insufficiently react with an anhydride of lower fatty acid, so that a resin having a low molecular weight is obtained. Examples of another method for producing the thermoplastic resin constituted by (i) the compound having a carboxyl group or an ester group at both polymer chain ends of the biphenyl group, (ii) the compound having a hydroxyl group at both polymer chain ends of the substituent R, and (iii) the compound having a carboxyl group or an ester group in the substituent A having an effect of folding a main chain encompass a method described in Japanese Patent Application Publication, Tokukaihei, No. 2-258864 A in which method 4,4'-biphenyldicarboxylic acid dimethyl and aliphatic diol are melt-polymerized.

The thermoplastic resin in accordance with the present invention can be produced by use of a catalyst. In a case where the thermoplastic resin is produced by the method in accordance with the present invention, one or more types of compounds selected from various metal compounds or organic sulfonic acid compounds are used. Examples of such compounds encompass antimony, titanium, germanium, tin, zinc, aluminum, magnesium, calcium, manganese, sodium, and cobalt. Meanwhile, examples of the organic sulfonic acid compound encompass sulfosalicylic acid, antimony trioxide (CS), and o-sulfobenzoic anhydride (OSB), and in particular, CS and OSB are preferably used. The catalyst is generally added in $0.1 \times 10^{-2}$ to $100 \times 10^{-2}$% by weight, preferably $0.5 \times 10^{-2}$ to $50 \times 10^{-2}$% by weight, and more preferably $1 \times 10^{-2}$ to $10 \times 10^{-2}$% by weight with respect to a total weight of the thermoplastic resin.

A structure of a polymer chain end of the thermoplastic resin in accordance with the present invention is not particularly limited. For the sake of obtaining a resin suitable for the injection molding, however, it is preferable that the polymer chain end is blocked with a hydroxyl group, a carboxyl group, an ester group, an acyl group, an alkoxy group, an amino group, an amide group, a thiol group, an isocyanate group, or the like. In a case where the polymer chain end has a highly reactive functional group such as an epoxy group or a maleimide group, it may be possible that the resin becomes thermosetting, so that an injection molding property of the resin is damaged.

In order to further increase the thermal conductivity of the resin composition in a case where the inorganic filler is blended, a ratio of the carboxyl group with respect to all polymer chain ends is not less than 60 mol %, preferably not less than 70 mol %, and more preferably 80 mol %. In a case where the ratio of the carboxyl group with respect to all the polymer chain ends is less than 60 mol %, it may be possible that when the inorganic filler is blended, the resin composition has a lower thermal conductivity than a resin having the carboxyl group of not less than 60 mol %. According to the present invention, a ratio of lamellar crystal contained in the thermoplastic resin is preferably not less than 10 vol %. The ratio of lamellar crystal is preferably not less than 20 vol %, more preferably not less than 30 vol %, and particularly preferably not less than 40 vol %.

The lamellar crystal referred to in the present invention corresponds to a plate-like shaped crystal in which folded long chain molecules are arranged in parallel to each other. The thermoplastic resin and the resin composition having a higher ratio of lamellar crystal tend to have a higher thermal conductivity. Whether or not the lamellar crystal is contained in the resin can be easily determined by use of transmission electron microscope (TEM) observation or X-ray diffraction. The ratio of lamellar crystal can be found out by directly observing, by a transmission electron microscope (TEM), a sample dyed with $RuO_4$. Specifically, the sample for the TEM observation is an ultrathin slice of 0.1 μm in thickness, prepared by cutting out a part of a molded cylindrical sample (6 mm in thickness×20 mm ϕ), and dying with $RuO_4$, and thinning the dyed sample with a microtome. The ultrathin slice thus prepared is observed by TEM at an acceleration voltage of 100 kV. From a photograph having a 40000× scale (18 cm×25 cm) thus obtained in the observation, it is possible to determine a lamellar crystal region. A boundary of the lamellar crystal region can be determined by identifying a region having a periodic contrast as the lamellar crystal region. The lamellar crystal is also distributed in a depth direction in the similar manner, so that the ratio of lamellar crystal can be calculated as a ratio of the lamellar crystal region with respect to a total area of the photograph.

The thermal conductivity of the thermoplastic resin in accordance with the present invention can be further increased by blending an inorganic filler therein. The thermal conductivity of the resin composition is preferably not less than 0.4 W/(m·K), more preferably not less than 1.0 W/(m·K), further preferably not less than 5.0 W/(m·K), and particularly preferably not less than 10 W/(m·K). In a case where the thermal conductivity of the resin composition is less than 0.4 W/(m·K), heat generated from an electronic component is difficult to be efficiently exhausted outside. An upper limit of the thermal conductivity of the resin composition is not particularly limited, and it is preferable that the resin composition has a higher thermal conductivity. In general, the thermal conductivity of the resin composition to be used is not more than 100 W/(m·K), and further not more than 80 W/(m·K). The thermoplastic resin in accordance with the present invention has an excellent thermal conductivity, so that a highly thermally conductive thermoplastic resin composition having a thermal conductivity within the above-mentioned range can be easily obtained.

It is preferable that a melt flow rate which indicates a melt fluidity of the thermoplastic resin in accordance with the present invention composition is higher. The thermoplastic resin composition in accordance with the present invention contains the thermoplastic resin in accordance with the present invention. Accordingly, the melt flow rate of the thermoplastic resin composition in accordance with the present invention increases as compared with a melt flow rate of a thermoplastic resin composition containing a thermoplastic resin in which no unit (C) is added (unit (A):unit (B):unit (C)=$X_A$:$X_B$:0). Specifically, the melt flow rate of the thermoplastic resin composition preferably increases by not less than 1.1 times, more preferably not less than 1.5 times, and particularly preferable not less than 2 times.

As to an amount of the inorganic filler to be used in the thermoplastic resin in accordance with the present invention, the thermoplastic resin and the inorganic filler is preferably used in a volume ratio of 90:10 to 30:70, more preferably 80:20 to 40:60, and particularly preferably 70:30 to 50:50. In a case where the thermoplastic resin and the inorganic filler are used in a volume ratio of 100:0 to 90:10, a sufficient thermal conductivity would not be obtained. Further, in the case where the thermoplastic resin and the inorganic filler are used in a volume ratio of 30:70 to 0:100, a mechanical property would decrease. Since the thermoplastic resin in accordance with the present invention has an excellent thermal conductivity, the resin composition has an excellent thermal conductivity even in case where the amount of the inorganic filler used is so small that the thermoplastic resin and the inorganic filler are used in a volume ratio of 90:10 to 70:30. Additionally, density of the resin composition can be reduced because the amount of the inorganic filler is small. A resin composition having an excellent thermal conductivity and low density has an advantage when used as a heat releasing or heat conducting resin material in various fields such as electric and electronic industries and car industries.

A wide range of well-known fillers can be used as the inorganic filler. The inorganic filler used is one having, by itself, a thermal conductivity of preferably not less than 1 W/(m·K), more preferably not less than 10 W/(m·K), further preferably not less than 20 W/(m·K), and particularly preferably not less than 30 W/(m·K). An upper limit of the thermal conductivity of the inorganic filler itself is not particularly limited, and it is preferable that the thermal conductivity of the inorganic filler is higher. In general, the thermal conductivity of the inorganic filler itself to be used is preferably not more than 3000 W/(m·K), and further preferably not more than 2500 W/(m·K).

In a case where the resin composition is used for an application in which the resin composition is not particularly required to have an electrical insulation property, the inorganic filler may be preferably a compound such as a metal compound and a conductive carbon compound. Among such materials, (i) a conductive carbon material such as graphite and carbon fiber, (ii) conductive metal powder obtained by microparticulating various metals, (iii) conductive metal fiber obtained by processing various metals into a fiber form, (iv) various ferrites such as a soft magnetic ferrite, and (v) metal oxide such as zinc oxide, can be preferably used as the inorganic filler because these materials have excellent thermal conductivities.

In a case where the resin composition is used for an application in which the resin composition is required to have an electrical insulation property, a compound having an electrical insulation property is preferably used. Here, the electrical insulation property means a property having an electrical resistance of not less than 1 Ω·cm. It is preferable to use a compound having an electrical resistance preferably of not less than 10 Ω·cm, more preferably of not less than $10^5$ Ω·cm, further preferably of not less than $10^{10}$ Ω·cm, and most preferably of not less than $10^{13}$ Ω·cm. An upper limit of the electrical resistance is not particularly limited. In general, a compound having an electrical resistance of not more than $10^{18}$ Ω·cm is used. It is preferable that a molded member obtained from the highly thermally conductive thermoplastic resin composition in accordance with the present invention also has an electrical insulation property within the above-mentioned range.

Among the inorganic fillers, specific examples of the compounds having an electrical insulation property encompass (i) metal oxides such as aluminum oxide, magnesium oxide, silicon oxide, beryllium oxide, copper oxide, and cuprous oxide, (ii) metal nitrides such as boron nitride, aluminum nitride, and silicon nitride, (iii) metal carbides such as silicon carbide, (iv) metal carbonates such as magnesium carbonate, (v) insulating carbon materials such as diamond, and (vi) metal hydroxides such as aluminum hydroxide and magnesium hydrate. These compounds can be used solely or in combination of two or more types of compounds.

Inorganic fillers in various shapes can be employed as the inorganic filler. Examples of the various shapes encompass a particle, a fine particle, a nanoparticle, an agglomerated particle, a tube-like shape, a nanotube-like shape, a wire-like shape, a rod-like shape, a needle-like shape, a plate-like shape, a random shape, a rugby ball-like shape, a hexahedron shape, a combined particle in which a large particle and a fine particle are combined with each other, and a liquid. Such an inorganic filler can be either natural or synthetic. In the case where the inorganic filler is natural, the inorganic filler is not particularly limited, e.g., as to location from which the inorganic filler comes from, and the inorganic filler can be appropriately selected from ones, which come from various locations. The inorganic filler can be used solely or in combination of two or more types of inorganic fillers which differ from each other in shape, average particle size, type, surface treatment agent, and/or the like.

The inorganic filler may be one having been subjected to a surface treatment with a surface treatment agent such as a silane treatment agent, in order to attain better adhesiveness at an interface between the resin and the inorganic compound or to facilitate processability. Such a surface treatment agent is not particularly limited, and a conventionally well-known surface treatment agent such as a silane coupling agent and a titanate coupling agent can be used, for example. In particular, (i) a silane coupling agent containing an epoxy group such as epoxy silane, (ii) a silane coupling agent containing an amino group such as aminosilane, and (iii) a polyoxyethylene silane, are preferable because these silane coupling agents are less likely to reduce a physical property of the resin. A method for carrying out the surface treatment of the inorganic compound is not particularly limited, and a general surface treatment method can be used.

A wide range of well-known fillers for various purposes as required, other than the inorganic filler described above can be added in the thermoplastic resin in accordance with the present invention. Since the resin itself has a high thermal conductivity, even in a case where the well-known filler having a relatively low thermal conductivity of less than 10 W/(m·K) is used, the resin composition has a high thermal conductivity. Examples of a filler other than the inorganic filler encompass diatomite powder, basic magnesium silicate, calcined clay, micronized silica, quartz powder, crystalline silica, kaolin, talc, antimony trioxide, micronized mica, molybdenum disulfide, inorganic fiber such as rock wool, ceramic fiber, and asbestos, and a glass filler such as glass fiber, glass powder, glass cloth, and molten silica. Use of such a filler makes it possible to increase a property such as a thermal conductivity, a mechanical strength, or abrasion resistance, which property is preferable for an application of the resin composition. Moreover, as needed, it is possible to blend, in combination, an organic filler such as paper, pulp, wood, a synthetic fiber (e.g., polyamide fiber, aramid fiber, and boron fiber), and resin powder (e.g., polyolefin powder).

As long as the effect of the present invention can be still attained, the thermoplastic resin in accordance with the present invention can contain any well-known resin such as an epoxy resin, a polyolefin resin, a bismaleimide resin, a polyimide resin, a polyether resin, a phenolic resin, a silicon resin, a polycarbonate resin, a polyamide resin, a polyester resin, a fluororesin, an acrylic resin, a melamine resin, a urea resin, and an urethane resin. Specific examples of a preferable resin encompass polycarbonate, polyethylene terephthalate, polybutylene terephthalate, a liquid crystal polymer, nylon 6, and nylon 6,6. With respect to 100 parts by weight of the thermoplastic resin in accordance with the present invention contained in the resin composition, an amount of such a resin contained in the resin composition is generally in a range of 0 part by weight to 10000 parts by weight, preferably in a range of 0 part by weight to 100 parts by weight, more preferably in a range of 0 part by weight to 50 parts by weight, and particularly preferably in a range of 0 part by weight to 25 parts by weight.

The thermoplastic resin in accordance with the present invention may contain an additive for any purpose as required, other than the resin and the filler described above, provided that the effect of the present invention can be still attained. For example, any other component such as a reinforcing agent, a thickener, a mold releasing agent, a coupling agent, a flame retardant, a flame resistant agent, a pigment, a coloring agent, and other auxiliary agents can be added to the thermoplastic resin in accordance with the present invention. Such an additive is preferably used in a range of 0 part by weight to 20 parts by weight in total with respect to 100 parts by weight of the thermoplastic resin.

A method for blending a material to the thermoplastic resin in accordance with the present invention is not particularly limited. For example, the thermoplastic resin in accordance with the present invention can be produced by drying a component, an additive, or the like described above, and then carrying out melt-kneading by use of a melt-kneading device such as a extruder having a single screw, twin screws, or the like. In a case where a blended component is a liquid, the thermoplastic resin in accordance with the present invention can be also produced by adding, in the middle of the melt-kneading, the liquid into the melt-kneading device by use of a liquid supply pump or the like.

The ratio of lamellar crystal contained in the thermoplastic resin in accordance with the present invention can be appropriately set by adjusting molding temperatures of the thermoplastic resin and the resin composition. For example, in a case where the thermoplastic resin and the resin composition in accordance with the present invention are injection molded, it is possible to obtain a molded member having a high lamellar crystal ratio and a high thermal conductivity by heating the resin at a temperature between the liquid crystalline phase transition temperature and the isotropic phase transition temperature, so as to be injected in a liquid crystalline state. Therefore, according to the present invention, it is possible to obtain the molded member having a high lamellar crystal ratio and a high thermal conductivity by molding, at an appropriate temperature, the thermoplastic resin having a low lamellar crystal ratio and a low thermal conductivity. In other words, such a low lamellar crystal ratio does not cause the thermoplastic resin and the resin composition in accordance with the present invention to lose their usefulness. It is possible to determine whether or not a molded member is made of the thermoplastic resin composition in accordance with the present invention by carrying out a $^1$H-NMR measurement to the molded member, so as to analyze whether or not the molar ratio of units (A) through (C) is in accordance with the thermoplastic resin composition. Note that the molded member contains a pellet.

The thermoplastic resin in accordance with the present invention can be widely used for various applications such as an electronic material, a magnetic material, a catalytic material, a structure material, an optical material, a medical material, an automotive material, and an architectural material. In particular, since the thermoplastic resin in accordance with the present invention has excellent properties, that is, both molding processability and a high thermal conductivity, the thermoplastic resin in accordance with the present invention is extremely useful as a heat releasing or heat conducting resin material.

The thermoplastic resin in accordance with the present invention can be preferably employed for an injection-molded product such as household electrical appliances, OA equipment parts, AV equipment parts, automotive exterior and interior parts, and the like. In particular, the thermoplastic resin in accordance with the present invention can be preferably employed as an exterior material in household electrical appliances and OA equipment each of which generates a large amount of heat. Moreover, the thermoplastic resin in accordance with the present invention is preferably employed as an exterior material of an electronic device in which a heating source is included but it is difficult to carry out a forced cooling by a fan or the like in order that heat generated inside of the electronic device may be released to outside of the electronic device. In particular, the thermoplastic resin in accordance with the present invention is extremely useful as a resin for a casing, a housing, or an external material for (i) a portable computer such as a laptop personal computer and (ii) a small-sized or portable electronic device such as a PDA, a mobile phone, a portable game machine, a portable music player, a portable TV/video device, and a portable video camera. Further, the thermoplastic resin in accordance with the present invention is also extremely useful as a resin for battery peripheral of a vehicle, a train, and the like, a resin for a portable battery of household electrical appliances, a resin for a power distribution part such as a breaker, and a sealing material for a motor.

The thermoplastic resin in accordance with the present invention can be further caused to have a high thermal conductivity and excellent molding processability as compared with a conventionally well-known resin. For this reason, the thermoplastic resin in accordance with the present invention has a useful property as a part or housing for the applications described above.

The specific embodiments described in the description of embodiments or examples serve solely to illustrate the technical details of the present invention, and should not be narrowly interpreted within the limits of such specific embodiments or examples, but rather can be applied in many variations within the spirit of the present invention and the scope of the claims described below.

Note that the present invention includes the following inventions 2) through 15) in addition to the invention described in 1) of Solution to Problem.

2)

The thermoplastic resin as set forth in 1), wherein X in the general formula (1) is O and Y in the general formula (2) is CO.

3)

The thermoplastic resin as set forth in 1) or 2), wherein R of the thermoplastic resin is a linear aliphatic hydrocarbon chain.

4)
The thermoplastic resin as set forth in any one of 1) through 3), wherein R of the thermoplastic resin has a main chain length of an even number.

5)
The thermoplastic resin as set forth in any one of 1) through 4), wherein R of the thermoplastic resin is at least one selected from the group consisting of —$(CH_2)_8$—, —$(CH_2)_{10}$—, and —$(CH_2)_{12}$—.

6)
The thermoplastic resin as set forth in any one of 1) through 5), wherein A of the thermoplastic resin is any one of structures shown below.

[Chem. 7]

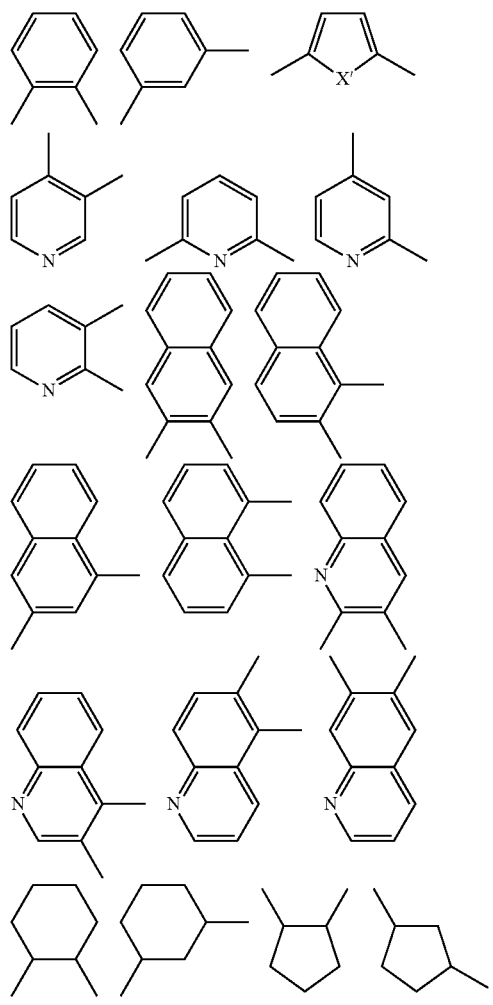

(where X′ is one of O, S, and NH.)

7)
The thermoplastic resin as set forth in any one of 1) through 6), wherein the thermoplastic resin has a number average molecular weight of 3000 to 40000.

8)
The thermoplastic resin as set forth in any one of 1) through 7), wherein not less than 60 mol % of polymer chain ends are carboxyl groups.

9)
The thermoplastic resin as set forth in any one of 1) through 8), wherein the thermoplastic resin contains a lamellar crystal by not less than 10 vol %.

10)
The thermoplastic resin as set forth in any one of 1) through 9), wherein a thermal conductivity of the thermoplastic resin itself is not less than 0.6 W/(m·K).

11)
A thermoplastic resin composition including a thermoplastic resin as set forth in any one of 1) through 10); and an inorganic filler.

12)
The thermoplastic resin composition as set forth in 11), wherein the inorganic filler is an inorganic compound having a thermal conductivity of not less than 1 W/(m·K) by itself.

13)
The thermoplastic resin composition as set forth in 11) or 12), wherein the inorganic filler is one or more electrically-insulative highly thermally conductive inorganic compounds selected from the group consisting of boron nitride, aluminum nitride, silicon nitride, aluminum oxide, magnesium oxide, magnesium carbonate, aluminum hydroxide, magnesium hydrate, beryllium oxide, and diamond.

14)
The thermoplastic resin composition as set forth in any one of 11) through 13), wherein the inorganic filler is one or more electrically-conductive highly thermally conductive inorganic compounds selected from the group consisting of graphite, electrically-conductive metal powder, soft magnetism ferrite, carbon fiber, electrically-conductive metal fiber, and zinc oxide.

15)
A molded member produced from a thermoplastic resin composition as set forth in any one of 11) through 14).

EXAMPLES

The following description will more specifically discuss the thermoplastic resin and the resin composition in accordance with the present invention with reference to Examples and Comparative Examples. It should be noted that the present invention is not limited to such Examples. Note that reagents manufactured by Wako Pure Chemical Industries, Ltd. were used below without being refined, unless otherwise specified.

[Evaluation Method]

Number average molecular weight: A sample was prepared by dissolving the thermoplastic resin in accordance with the present invention in a volume ratio of 3:8 mixed solvent of p-chlorophenol (manufactured by Tokyo Chemical Industry Co., Ltd.) and toluene so that the sample has a concentration of 2.5% by weight. Polystyrene was used as a standard material for preparing a similar sample solution. The measurement was carried out by high-temperature GPC (Viscotek: 350 HT-GPC System) under the conditions of column temperature: 80° C. and flow rate: 1.00 mL/min. A differential refractometer (RI) was used as a detector.

Molding of test piece: The sample thus obtained was dried and then molded into disk samples of 6 mm in thickness×20 mm φ by an injection molding device. A cylinder temperature was set at a temperature 20° C. higher than the liquid crystalline phase transition temperature, and the sample was injected in a liquid crystalline state.

Thermal conductivity: A thermal conductivity of the disk sample (6 mm in thickness×20 mm φ) was measured by use of a sensor of 4 φ in a hot disk method thermal conductivity measuring device (KYOTO ELECTRONICS MANUFACTURING CO., LTD.: TPS-2500).

Melt flow rate (MFR): The sample thus obtained was dried and then MFR of the sample thus obtained was measured by a flow property evaluation device (Shimadzu Corporation: CFT-500D). A measurement temperature for Examples 1, 2, 6 through 8, and 11 and 12 and Comparative examples 1, 6, and 7 was approximately 20° C. higher than the liquid crystalline phase transition temperature (i.e., a temperature between the liquid crystalline phase transition temperature and the isotropic phase transition temperature). A measurement temperature for Examples 3 through 5 and Comparative example 2 was approximately 35° C. higher than the liquid crystalline phase transition temperature (i.e., a temperature between the liquid crystalline phase transition temperature and the isotropic phase transition temperature).

Determination of polymer chain end carboxyl group: A ratio of carboxyl group polymer chain end was measured on the basis of an integral value of a property signal of each polymer chain end group by use of $^1$H-NMR (measured in a solvent of 400 MHz, deuterated chloroform trifluoroacetic acid=2:1 vol %). Table 1 shows a chemical shift value of typical signals which were used in the measurement. The polymer chain end carboxyl group was not less than 99 mol % in Examples and Comparative examples unless otherwise specified.

Ratio of lamellar crystal: A slice was cut out, for observation, from the molded sample (6 mm in thickness×20 mm φ) and dyed with $RuO_4$. Then, an ultrathin slice of 0.1 μm in thickness prepared by a microtome was observed by TEM at an acceleration voltage of 100 kV. A ratio of lamellar crystal region was calculated as a ratio of lamellar crystal region with respect to a total area of a photograph on the basis of the photograph having a 40000× scale obtained by TEM observation.

Flexural strength: A flexural strength of the thermoplastic resin composition was measured in accordance with ASTM D790 by use of a test piece (127 mm×12.7 mm×a thickness of 3.2 mm).

TABLE 1

| Types of polymer chain end group | Chemical shift value of property signal |
|---|---|
| 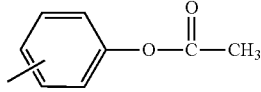 | σ 2.45 ppm |
|  | σ 2.49 ppm |

Example 1

4,4'-dihydroxybiphenyl (450 g), dodecanedioic acid, catechol, and acetic anhydride (i) were added in a molar ratio of 0.9:1.1:0.1:2.1 in a sealed reactor vessel which is provided with a reflux condenser, a thermometer, a nitrogen introduction tube, and a stirring rod and (ii) were reacted with each other by use of sodium acetate as a catalyst under an ordinary pressure in an atmosphere of nitrogen at 145° C., so as to obtain a homogeneous solution. Then, a temperature of the solution thus obtained was raised to 240° C. at 2° C./min while acetic acid was distilled away, and the solution was stirred at 240° C. for 30 minutes. Further, a temperature of the solution was raised to 260° C. at 1° C./min, and the solution was stirred at 260° C. for 1 hour. A pressure of the sealed reactor vessel was reduced to 10 torr over approximately 40 minutes with the temperature maintained, and then the reduced pressure was maintained. In 3 hours after the start of the pressure reduction, the pressure was brought back to an ordinary pressure by use of a nitrogen gas, and then a polymer thus generated was taken out. Table 2 shows a molecular structure of the resin thus obtained, and Table 4 shows a number average molecular weight, a thermal conductivity of the resin itself, and MFR.

Example 2

Polymerization was carried out in the same manner as Example 1, except that (i) the molar ratio of 4,4'-dihydroxybiphenyl and catechol was changed to 0.8:0.2 and (ii) the temperature under a reduced pressure was set 250° C., so as to synthesize a resin being different in copolymerization ratio. Table 2 shows a molecular structure of the resin thus obtained, and Table 4 shows a number average molecular weight, a thermal conductivity of the resin itself, and MFR.

Example 3

Polymerization was carried out in the same manner as Example 1, except that (i) sebacic acid was used instead of dodecanedioic acid and (ii) the temperature under a reduced pressure was set 270° C., so as to synthesize a resin being different in length of saturated aliphatic hydrocarbon chain. Table 2 shows a molecular structure of the resin thus obtained, and Table 4 shows a number average molecular weight, a thermal conductivity of the resin itself, and MFR. Further, a ratio of lamellar crystal contained in a sample for a thermal conductivity measurement was 70 vol %.

Examples 4 and 5

Polymerization was carried out in the same manner as Example 3, except that the molar ratio of 4,4'-dihydroxybiphenyl and catechol was changed to 0.95:0.05 in Example 4, and 0.7:0.3 in Example 5, respectively, so as to synthesize a resin being different in copolymerization ratio. Table 2 shows a molecular structure of the resin thus obtained, and Table 4 shows a number average molecular weight, a thermal conductivity of the resin itself, and MFR.

Examples 6 and 7

Polymerization was carried out in the same manner as Example 2, except that catechol was changed to resorcinol in Example 6 and o-phenylenediamine (manufactured by Aldrich) in Example 7, respectively, so as to synthesize a resin being different in molecular structure. Table 2 shows a molecular structure of the resin thus obtained, and Table 4 shows a number average molecular weight, a thermal conductivity of the resin itself, and MFR.

Example 8

Polymerization was carried out in the same manner as Example 1, except that (i) catechol was changed to o-hydroxybenzoic acid and (ii) the molar ratio of 4,4'-dihydroxybiphenyl, dodecanedioic acid, and o-hydroxybenzoic acid (manufactured by Tokyo Chemical Industry Co., Ltd.) was changed to 0.9:1.0:0.2, respectively, so as to synthesize a resin being different in molecular structure. Table 2 shows a molecular structure of the resin thus obtained, and Table 4 shows a number average molecular weight, a thermal conductivity of the resin itself, and MFR.

Example 9

Polymerization was carried out in the same manner as Example 1, except that (i) the molar ratio of 4,4'-dihydroxybiphenyl, dodecanedioic acid, and catechol was changed to 0.9:1.05:0.1 and (ii) time for the pressure reduction was changed to 45 minutes after the start of the pressure reduction. Table 2 shows a molecular structure of the resin thus obtained, and Table 4 shows a number average molecular weight and a thermal conductivity of the resin itself. The polymer chain end carboxyl group was 64 mol %.

Example 10

Polymerization was carried out in the same manner as Example 3, except that the molar ratio of 4,4'-dihydroxybiphenyl, sebacic acid, and catechol was changed to 0.9:0.9:0.1, so as to synthesize a resin having a polymer chain end carboxyl group of 0 mol %. Table 2 shows a molecular structure of the resin thus obtained, and Table 4 shows a number average molecular weight and a thermal conductivity of the resin itself.

Comparative examples 1 and 2

Polymerization was carried out in the same manner as Examples 1 and 3, except that (i) the molar ratio of 4,4'-dihydroxybiphenyl and catechol was changed to 1.0:0, so as to synthesize a resin containing no unit (C). Table 3 shows a molecular structure of the resin thus obtained, and Table 4 shows a number average molecular weight, a thermal conductivity of the resin itself, and MFR.

Comparative example 3

Polymerization was carried out in the same manner as Example 1, except that (i) the molar ratio of 4,4'-dihydroxybiphenyl and catechol was changed to 0.5:0.5 and (ii) the temperature under a reduced pressure was changed to 240° C., so as to synthesize a resin being different in copolymerization ratio. Table 3 shows a molecular structure of the resin thus obtained, and Table 4 shows a number average molecular weight, a thermal conductivity of the resin itself, and MFR.

Comparative example 4

Polymerization was carried out in the same manner as Example 1, except that (i) catechol was changed to terephthalic acid and (ii) the molar ratio of 4,4'-dihydroxybiphenyl, dodecanedioic acid, terephthalic acid was changed to 1.0:1.0:0.1, so as to synthesize a resin being different in molecular structure. Table 3 shows a molecular structure of the resin thus obtained, and Table 4 shows a number average molecular weight and a thermal conductivity of the resin itself.

Comparative example 5

Polymerization was carried out in the same manner as Comparative example 1, except that (i) the molar ratio of 4,4'-dihydroxybiphenyl, dodecanedioic acid, and catechol was changed to 1.0:1.05:0 and (ii) time for the pressure reduction was changed to 1 hour after the start of the pressure reduction, so as to synthesize a resin having a low ratio of polymer chain end carboxyl group. Table 3 shows a molecular structure of the resin thus obtained, and Table 4 shows a number average molecular weight, a thermal conductivity of the resin itself, and MFR. The polymer chain end carboxyl group was 65 mol %.

Examples 11 and 12

A mixture was prepared in which (i) the thermoplastic resin (I) which was synthesized in Example 1, (ii) a PBT resin (II), (iii) boron nitride (h-BN) (PT110 manufactured by Momentive Performance Materials Inc.; average particle size: 45 μm; electrically insulative; volume resistivity: $10^{14}$ Ω·cm) which was an inorganic filler (III), (iv) glass fiber (T-187H/PL manufactured by Nippon Electric Glass Co., Ltd.) which was a glass filler (IV) were mixed in accordance with compositions shown in Table 5. AO-60 (manufactured by ADEKA CORPORATION) which was a phenolic stabilizer was added to the mixtures in 0.2 part by weight with respect to the thermoplastic resin (I). Then, the mixture was melt-mixed by use of an extruder, so as to obtain a resin composition for evaluation. Table 5 shows MFR of the resin composition.

Comparative example 6

A resin composition for evaluation was obtained in the same manner as Example 11, except that the thermoplastic resin synthesized in Example 1 was changed to the thermoplastic resin synthesized in Comparative example 1. Table 5 shows a measurement result of MFR of the resin composition.

Comparative example 7

A resin composition for evaluation was obtained in the same manner as Example 12, except that the thermoplastic resin synthesized in Example 1 was changed to the thermoplastic resin synthesized in Comparative example 1. Table 5 shows a measurement result of MFR of the resin composition.

TABLE 2

| | X | Y | R | —$Z^1$—A—$Z^2$ | Unit (A):<br>Unit (B):<br>Unit (C) |
|---|---|---|---|---|---|
| Example 1 | O | CO | $(CH_2)_{10}$ | 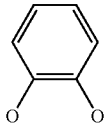 | 43:52:5 |
| Example 2 | O | CO | $(CH_2)_{10}$ | 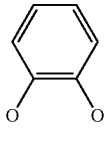 | 38:52:10 |
| Example 3 | O | CO | $(CH_2)_8$ | 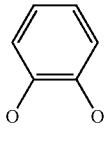 | 43:52:5 |
| Example 4 | O | CO | $(CH_2)_8$ | 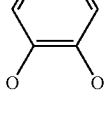 | 45:52:2 |

TABLE 2-continued

| | X | Y | R | —Z$^1$—A—Z$^2$ | Unit (A):<br>Unit (B):<br>Unit (C) |
|---|---|---|---|---|---|
| Example 5 | O | CO | (CH$_2$)$_8$ | catechol (1,2-benzenediol diester) | 33:52:14 |
| Example 6 | O | CO | (CH$_2$)$_{10}$ | resorcinol (1,3-benzenediol diester) | 38:52:10 |
| Example 7 | O | CO | (CH$_2$)$_{10}$ | o-phenylenediamine diamide (HN—C$_6$H$_4$—NH) | 38:52:10 |
| Example 8 | O | CO | (CH$_2$)$_{10}$ | salicylic ester (O—C$_6$H$_4$—CO) | 43:48:10 |
| Example 9 | O | CO | (CH$_2$)$_{10}$ | catechol (1,2-benzenediol diester) | 44:51:5 |
| Example 10 | O | CO | (CH$_2$)$_8$ | catechol (1,2-benzenediol diester) | 47:47:5 |

TABLE 3

| | X | Y | R | —Z$^1$—A—Z$^2$ | |
|---|---|---|---|---|---|
| Comparative example 1 | O | CO | (CH$_2$)$_{10}$ | None | |
| Comparative example 2 | O | CO | (CH$_2$)$_8$ | None | |
| Comparative example 3 | O | CO | (CH$_2$)$_{10}$ | catechol (1,2-benzenediol diester) | 24:52:24 |
| Comparative example 4 | O | CO | (CH$_2$)$_{10}$ | OC—C$_6$H$_4$—CO (terephthaloyl) | 48:48:5 |
| Comparative example 5 | O | CO | (CH$_2$)$_{10}$ | None | |

TABLE 4

| | Ex. 1 | Ex. 2 | Ex. 3 | Ex. 4 |
|---|---|---|---|---|
| NAMW | 8300 | 8000 | 7700 | 9000 |
| TC of resin itself [W/(m·K)] | 1.05 | 0.96 | 1.04 | 0.75 |
| MFR [g/10 min] | 573 (210) | 1170 (210) | 1117 (235) | 59 (245) |

| | Ex. 5 | Ex. 6 | Ex. 7 | Ex. 8 |
|---|---|---|---|---|
| NAMW | 6300 | 8400 | 3400 | 6700 |
| TC of resin itself [W/(m·K)] | 0.78 | 0.81 | 0.88 | 0.70 |
| MFR [g/10 min] | 1141 (225) | 769 (210) | 1150 (200) | 272 (220) |

| | Ex. 9 | Ex. 10 | Com. Ex. 1 | Com. Ex. 2 |
|---|---|---|---|---|
| NAMW | 3300 | 14500 | 9100 | 8800 |
| TC of resin itself [W/(m·K)] | 0.80 | 0.53 | 1.05 | 0.79 |
| MFR [g/10 min] | — | — | 163 (220) | 43 (245) |

| | Com. Ex. 3 | Com. Ex. 4 | Com. Ex. 5 |
|---|---|---|---|
| NAMW | 4900 | 11400 | 8400 |
| TC of resin itself [W/(m·K)] | 0.75 | 0.49 | 1.01 |
| MFR [g/10 min] | 1088 (150) | — | — |

(Note:
The numbers in parenthesis are measured temperatures of MFR.)
(Abbreviation: NAMW stands for Number Average Molecular Weight.
TC stands for Thermal Conductivity.
Ex. stands for Example.
Com. Ex. stands for Comparative Example.)

TABLE 5

| Composition [vol %] | | Example 11 | Example 12 | Comparative example 6 | Comparative example 7 |
|---|---|---|---|---|---|
| Resin (I) | Example 1 | 50 | 40 | | |
| | Comparative example 1 | | | 50 | 40 |
| PBT resin (II) | | | 10 | | 10 |
| h-BN (III) | | 30 | 30 | 30 | 30 |
| Glass fiber (IV) | | 20 | 20 | 20 | 20 |
| Flexural strength [MPa] | | 45 | 75 | 34 | 70 |
| MFR [g/10 min] | | 1700 (210) | 198 (210) | 72 (220) | 16 (220) |

(Note:
The numbers in parenthesis are measured temperatures of MFR.)

First, as to the example and the comparative example in which n of the methylene chain of the unit (B) is 10, the comparison between Example 1 and Comparative example 1 shows that a surprising result is obtained that although catechol, which was a third component, was added in 5 mol % in Example 1, the thermoplastic resin in Example 1 had the same thermal conductivity as the thermoplastic resin in Comparative example 1. Further, in Example 1, the melt flow rate increased, so as to increase injection molding processability.

In Example 2, catechol was added in 10 mol %, which was twice of the molar ratio of that in Example 1. However, the thermal conductivity decreases only by 0.9 W/(m·K), so that it was found that the thermoplastic resin having a high thermal conductivity is obtained even in a case where a molar ratio of catechol increases.

As to the example and the comparative example in which n of the methylene chain of the unit (B) is 8, the comparison between Example 3 and Comparative example 2 shows that the thermal conductivity was 0.79 W/(m·K) in Comparative example 2, whereas the thermal conductivity was 1.04 W/(m·K) in Example 3, in which catechol was used. Thus, extremely surprising result is obtained that adding the third component does not reduce but rather increases the thermal conductivity.

Meanwhile, the thermoplastic resin in Example 4 in which the molar ratio of catechol was reduced to 2 mol % had a thermal conductivity lower than that in Example 3. The thermoplastic resin in Example 5 had a high thermal conductivity similar to that in Example 4. However, in Example 5, since catechol had a high molar ratio, the melt flow rate was high. Further, as in Examples 6, 7, and 8, in a case where resorcinol, o-phenylenediamine, and o-hydroxybenzoic acid were used, respectively, the thermoplastic resin having a high thermal conductivity was obtained as same as catechol.

The thermoplastic resin in Example 9 had the polymer chain end carboxyl group of 64 mol %, which was lower than that in Example 1. For this reason, the thermoplastic resin in Example 9 had a lower thermal conductivity than that of the thermoplastic resin in Example 1. However, since not less than 60 mol % of the polymer chain ends were a carboxyl group, the thermoplastic resin in Example 9 had a practical thermal conductivity. Meanwhile, the thermoplastic resin in Example 10 had the polymer chain end carboxyl group of 0 mol %. As a result, the thermoplastic resin in Example 10 had a lower thermal conductivity than that of the thermoplastic resin in Example 3 which was identical with the thermoplastic resin in Example 10 in terms of catechol content (mol %).

In Comparative example 3, the unit (A) was set out of a range of the present invention, which was 24 mol %, so that the thermoplastic resin having a low thermal conductivity was obtained. In Comparative example 4, the terephthalic acid was used instead of catechol. The terephthalic acid derivative is para, so as not to have an effect of folding a main chain. For this reason, the thermal conductivity of the thermoplastic resin in Comparative example 4 was low, specifically 0.49 W/(m·K). Comparative example 4 shows an importance of the unit (C) having a folding effect. Since the thermoplastic resin in Comparative example 5 had the polymer chain end carboxyl group of 65 mol %, which is relatively a high value, the thermoplastic resin in Comparative example 5 had a high thermal conductivity.

In a case where Example 11 and Comparative example 6, and Example 12 and Comparative example 7 are compared with each other as an example in accordance with the thermoplastic resin composition, the flexural strength in Examples 11 and 12 is more increased than that in Comparative examples 6 and 7, and this indicates that the thermoplastic resin composition was improved to be less fragile. In other words, by polymerizing the unit (C), the thermoplastic resin in accordance with the present invention maintains a high thermal conductivity, so as to be a raw material of the thermoplastic resin composition improved in flexural strength. The thermoplastic resin composition has an increased flexural strength, and a high thermal conductivity as well as an excellent mechanical strength, so as to have an extremely high quality. Further, it was confirmed that MFR increases as same as that of the thermoplastic resin.

The resin in accordance with the present invention is a thermoplastic resin having (i) an excellent thermal conductivity and (ii) an excellent melt fluidity regardless of whether being injection-molded as the resin itself or as a resin composition in which an inorganic filler is blended, and (iii) an excellent molding processability. Such a thermoplastic resin and a resin composition can be used as a heat releasing or heat conducting resin material in various fields such as electric and electronic industries and car industries, thereby being industrially useful.

The invention claimed is:

1. A thermoplastic resin, having a main chain structure comprising:

a unit (A) by 25 mol % to 60 mol %, the unit (A) having a biphenyl group and being represented by general formula (1):

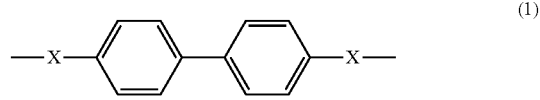

wherein X represents O;

a unit (B) by 25 mol % to 60 mol %, the unit (B) being represented by general formula (2):

—Y—R—Y— (2)

wherein R represents a bivalent linear substituent (a) whose number of atoms in its main chain length is 2 to 20 and (b) which is branched or not branched, and Y represents CO; and a unit (C) by 1 mol % to 25 mol %, the unit (C) being represented by general formula (3):

—Z$^1$-A-Z$^2$— (3)

wherein Z$^1$ and Z$^2$ represent a bivalent substituent(s) selected from the group consisting of O, and NH, and A represents a substituent selected from the group consisting of non-fused aromatic groups, fused aromatic groups, heterocyclic groups, alicyclic groups, and alicyclic heterocyclic groups, wherein each of the substituent A has an effect of folding a main chain, where a total amount of the units (A), (B), and (C) is 100 mol %, and wherein A of the thermoplastic resin is any one of structures shown below:

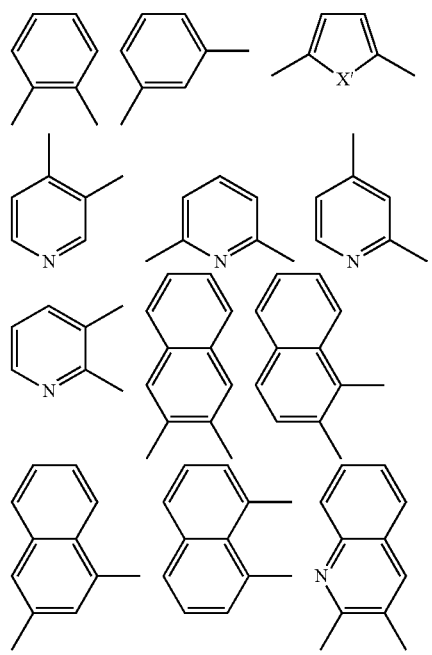

-continued

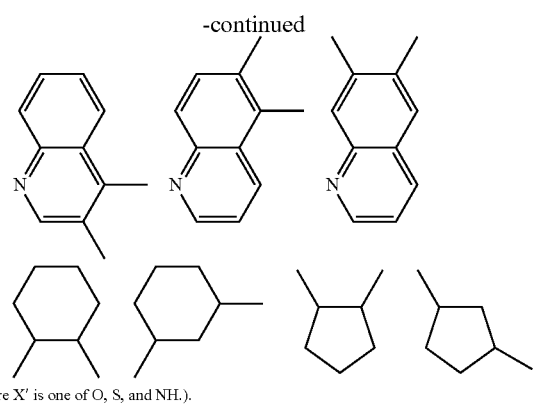

(where X' is one of O, S, and NH.).

2. The thermoplastic resin as set forth in claim 1, wherein R of the thermoplastic resin is a linear aliphatic hydrocarbon chain.

3. The thermoplastic resin as set forth in claim 1, wherein R of the thermoplastic resin has a main chain length of an even number.

4. The thermoplastic resin as set forth in claim 1, wherein R of the thermoplastic resin is at least one selected from the group consisting of $-(CH_2)_8-$, $-(CH_2)_{10}$, and $-(CH_2)_{12}-$.

5. The thermoplastic resin as set forth in claim 1, wherein the thermoplastic resin has a number average molecular weight of 3000 to 40000.

6. The thermoplastic resin as set forth in claim 1, wherein not less than 60 mol % of polymer chain ends are carboxyl groups.

7. The thermoplastic resin as set forth in claim 1, wherein the thermoplastic resin contains a lamellar crystal by not less than 10 vol %.

8. The thermoplastic resin as set forth in claim 1, wherein a thermal conductivity of the thermoplastic resin itself is not less than 0.6 W/(m·K).

9. A thermoplastic resin composition comprising:
a thermoplastic resin as set forth in claim 1; and
an inorganic filler.

10. The thermoplastic resin composition as set forth in claim 9, wherein the inorganic filler is an inorganic compound having a thermal conductivity of not less than 1 W/(m·K) by itself.

11. The thermoplastic resin composition as set forth in claim 9, wherein the inorganic filler is one or more electrically-insulative highly thermally conductive inorganic compounds selected from the group consisting of boron nitride, aluminum nitride, silicon nitride, aluminum oxide, magnesium oxide, magnesium carbonate, aluminum hydroxide, magnesium hydrate, beryllium oxide, and diamond.

12. The thermoplastic resin composition as set forth in claim 9, wherein the inorganic filler is one or more electrically-conductive highly thermally conductive inorganic compounds selected from the group consisting of graphite, electrically-conductive metal powder, soft magnetism ferrite, carbon fiber, electrically-conductive metal fiber, and zinc oxide.

13. A molded member produced from a thermoplastic resin composition as set forth in claim 9.

* * * * *